W. HAHNEMANN.
SUBMARINE TELEGRAPHY OR TELEPHONY.
APPLICATION FILED FEB. 17, 1913.
1,190,156.
Patented July 4, 1916.
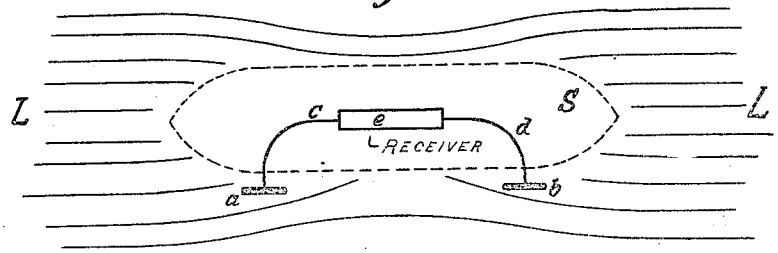
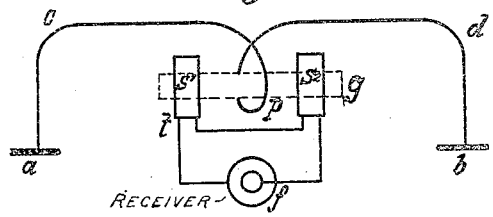
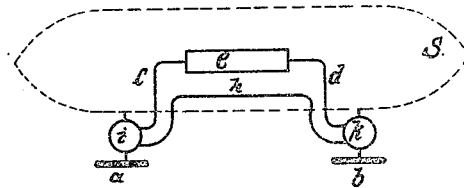
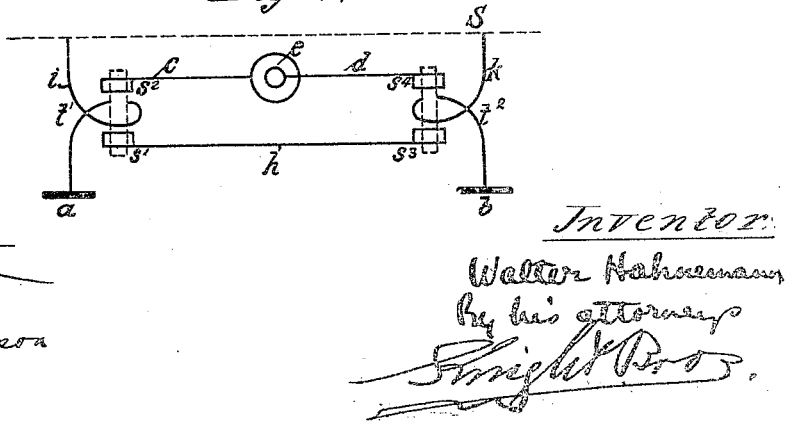

UNITED STATES PATENT OFFICE.

WALTER HAHNEMANN, OF KIEL, GERMANY.

SUBMARINE TELEGRAPHY OR TELEPHONY.

1,190,156.

Specification of Letters Patent.   Patented July 4, 1916.

Application filed February 17, 1913.   Serial No. 749,007.

*To all whom it may concern:*

Be it known that I, WALTER HAHNEMANN, engineer, a subject of the King of Saxony, residing at and whose post-office address is 214 Holtenauerstrasse, Kiel, Germany, have invented certain new and useful Improvements Relating to Submarine Telegraphy or Telephony, of which the following is a specification.

This invention relates to submarine telegraphy or telephony and has reference to systems of the kind in which current lines originating at a distant transmitting station are utilized to operate a telephone or other receiving instrument at a receiving station. In the case of communicating between ships, the problem arises as to how to provide for the receiving of an adequate current from the water in proximity to the body of the ship, in view of the fact that the ship's body offers what is practically a short circuit for the current lines that are passing through the water in its vicinity. The result of such short-circuiting action on the part of the ship's body is that a receiving circuit in parallel with this short-circuiting path is practically deprived of current, which would otherwise pass through it by way of the receiving members carried by the ship, such members usually being metal plates located in the water outside the ship.

Even if alternating currents are used of sufficient high frequency to increase the effective resistance of the ship's body to current lines passing through it, this resistance is still so small as compared with that of the usual receiving circuit, owing to the inclusion in the latter of a telephone, galvanometer, or the like, that a current of satisfactory strength does not traverse the receiving instrument.

According to the present invention and for the purpose of overcoming the defective action above noted the electrical dimensions of the receiving circuit in parallel with the short-circuiting path offered by the ship's body are such that the resistance of the circuit is so small as to be comparable in magnitude with that of the said short-circuiting path. The actual receiving instrument may be connected directly with conductors leading to it from the submerged metal plates or equivalent receiving members, or the said instrument may be merely coupled inductively to the conductors, and the latter may constitute a single conductor, extending from one plate to the other, or may consist of two conductors extending from the ship's body to the respective plates. In either case the cross sectional area of the conductor or pair of conductors is comparatively large and therefore of small electrical resistance, and if the receiving instrument is directly connected, it also should have small electrical resistance. In cases where the receiving instrument, a telephone for instance, is inductively coupled with the aforesaid conductor or conductors on the transformer principle, the resistance of the conductors of the secondary circuit bears a suitable relation to the resistance of the instrument itself.

In order that the invention may be clearly understood and readily carried into effect, the same will now be described more fully with reference to the accompanying drawings, in which:—

Figure 1 represents, diagrammatically, a ship in a region of current lines, and a receiving circuit in which the receiving instrument is connected directly in the circuit. Fig. 2 represents, diagrammatically, a modification in which the receiving instrument is inductively coupled by a single transformer arrangement. Figs. 3 and 4 represent, diagrammatically, a further modification in which the receiving instrument is inductively coupled by a double transformer arrangement.

Referring first to Fig. 1, S represents a ship's body, $a$ and $b$ are two receiving plates carried by it, $e$ is a receiving instrument, and $c$ and $d$ are conductors connecting the plates $a$ and $b$ respectively to the instrument $e$. The ship's body is in a region of current lines L L, which partly penetrate it and partly reach the plates $a$ and $b$. In accordance with the present invention the conductors $c$ and $d$ are of large cross section, and the receiving instrument $e$ is of very small resistance, the result being that the total resistance of the current path $a\ c\ e\ d\ b$ does not differ too considerably from the resistance of the ship's body to present a current of satisfactory strength from traversing the receiving instrument.

In the embodiment of the invention shown in Fig. 2 the general arrangement with respect to the ship's body is similar to that of Fig. 1, but the conductors $c$ and $d$ constitute a single conductor formed at an intermediate point in its length into the primary winding of a transformer $t$. This primary winding $p$ is wound around an iron core $g$, on which are also mounted the secondary windings $s^1$ $s^2$. The receiving instrument,—a telephone,—is shown at $f$ connected in series with the secondary windings $s^1$ $s^2$, of which the resistance and the number of convolutions bear a suitable relation to the electrical characteristics of the telephone $f$. In this case also, as in Fig. 1, the dimensions of the conductors $c$ $d$, including also those of the primary winding $p$, are such that the low electrical resistance of the current path $a$ $c$ $p$ $d$ $b$ enables the number of current lines originating at a distant transmitting apparatus and traversing this low resistance path to be sufficient to effectively actuate the receiving instrument by way of the transformer $t$. The conductors $c$ $d$ of Fig. 2, however, need not be quite so large in cross section as those of Fig. 1.

In the modified arrangement shown in Figs. 3 and 4, each of the receiving plates $a$ and $b$ is connected to the ship's body by means of a conductor constituting the primary of a transformer. The plate $a$ is connected to the ship's body by way of the primary winding $t'$ of a transformer $i$, and the plate $b$ by way of the primary winding $t^2$ of a transformer $k$. Current lines in the water at plate $a$ pass from the latter by way of the primary winding $t'$ to the ship's body, then through the latter, and out again into the water by way of the primary winding $t^2$ and plate $b$. The transformer windings $t^1$ $t^2$ are arranged close to the respective plates, whereby the result is insured that a current sufficient for receiving purposes actually flows through these windings.

The secondary windings $s^1$ $s^2$ and $s^3$ $s^4$ of the transformer $i$ and $k$ respectively form a secondary circuit, the windings $s^1$ $s^3$ being connected directly by the conductor $h$, and the windings $s^2$ $s^4$ connected by the conductors $c$ $d$ respectively to the receiving telephone $e$. The resistance and the number of convolutions of these secondary windings bear a suitable relation to the electrical characteristics of the telephone. With a telephone of adequately high resistance, the conductors $c$ $d$ and $h$ can have a very small cross section. The invention can therefore be carried into practice in a relatively simple manner, particularly if a high resistance telephone or other receiving instrument is used.

Having now particularly described and ascertained the nature of my said invention and in what manner the same is to be performed, I declare that what I claim is:—

1. A system of submarine telegraphy or telephony in which current lines originating at a distant transmitting station are utilized to operate a receiving instrument on a ship, said system having spaced submerged receiving electrodes carried by the ship, the resistance of the receiving circuit between said electrodes being so small as to be comparable with that of the short-circuiting path afforded by the ship's body, for the purpose specified.

2. A system of submarine telegraphy or telephony in which current lines originating at a distant transmitting station are utilized to operate a receiving instrument on a ship, said system having spaced submerged receiving electrodes carried by the ship and a receiving circuit in parallel with the short-circuiting path afforded by the ship's body, and the resistance of the receiving circuit between said electrodes being so small as to be comparable with that of the short-circuiting path afforded by the ship's body, for the purpose specified.

3. A system of submarine telegraphy or telephony in which current lines originating at a distant transmitting station are utilized to operate a receiving instrument on a ship, said system having a receiving circuit comprising a transformer system having a secondary circuit connected to the receiving instrument and a primary circuit comprising spaced submerged receiving electrodes carried by the ship, the resistance of the circuit between said electrodes being so small as to be comparable with that of the short-circuiting path afforded by the ship's body, for the purpose specified.

4. A system of submarine telegraphy or telephony in which current lines originating at a distant transmitting station are utilized to operate a receiving instrument on a ship, said system having a receiving circuit comprising a transformer system the secondary of which is connected to the receiving instrument while the primary circuit is arranged in parallel with the short-circuiting path afforded by the ship's body and has a resistance so small as to be comparable with that of the short-circuiting path afforded by the ship's body, for the purpose specified.

5. A system of submarine telegraphy or telephony in which current lines originating at a distant transmitting station are utilized to operate a receiving instrument on a ship, said system having a receiving circuit comprising a transformer system having a plurality of secondary circuits connected together through the receiving instrument, and a plurality of primary circuits therefor comprising spaced submerged receiving electrodes carried by the ship, the resistance between the said electrodes being so small as to be comparable with that of the short-circuiting path afforded by the ship's body, for the purpose specified.

6. A system of submarine telegraphy or telephony in which current lines originating at a distant transmitting station are utilized to operate a receiving instrument on a ship, said system having a receiving circuit comprising a transformer system having a plurality of secondary circuits connected together through the receiving instrument, and a plurality of primary circuits therefor arranged in parallel with the short-circuiting path afforded by the ship's body and having a resistance so small as to be comparable with that of the short-circuiting path afforded by the ship's body, for the purpose specified.

In testimony whereof I affix my signature in presence of two witnesses.

WALTER HAHNEMANN.

Witnesses:
  MAX KALWA,
  HUGO LIEKELT.